United States Patent
Weiner et al.

(10) Patent No.: US 6,903,033 B1
(45) Date of Patent: Jun. 7, 2005

(54) VINYL FLOORING PRODUCT AND METHOD OF MANUFACTURE

(75) Inventors: Robert S. Weiner, Atlanta, GA (US); John W. Waller, Ringgold, GA (US); Willard Clifton Owens, Chatsworth, GA (US)

(73) Assignee: Product Concepts Residential, L.L.C., Dalton, GA (US)

( * ) Notice: Subject to any disclaimer, the term of this patent is extended or adjusted under 35 U.S.C. 154(b) by 139 days.

(21) Appl. No.: 10/300,273

(22) Filed: Nov. 20, 2002

Related U.S. Application Data

(63) Continuation-in-part of application No. 10/125,290, filed on Apr. 18, 2002, now Pat. No. 6,696,004.

(51) Int. Cl.[7] .............................................. B32B 15/08
(52) U.S. Cl. ............................... 442/16; 442/2; 442/6; 442/19; 442/38; 442/43; 442/45; 442/46; 442/49; 428/46; 428/47; 428/48; 428/49; 428/141

(58) Field of Search ............................. 428/46, 47, 48, 428/49, 141; 442/2, 6, 16, 19, 38, 43, 45, 46, 49

(56) References Cited

U.S. PATENT DOCUMENTS 4,689,258 A * 8/1987 Slosberg et al. ............ 428/141
5,780,147 A * 7/1998 Sugahara et al. ........... 428/332

* cited by examiner

*Primary Examiner*—Ula Ruddock
(74) *Attorney, Agent, or Firm*—Stephen J. Stark; Miller & Martin PLLC

(57) ABSTRACT

An imbedded flooring product has a skeletal frame in the form of a mesh intermediate a first and second vinyl layer. The mesh creates a pattern visible from above the flooring product.

17 Claims, 2 Drawing Sheets

VINYL FLOORING PRODUCT AND METHOD OF MANUFACTURE

This application is a continuation-in-part of U.S. patent application Ser. No. 10/125,290 filed Apr. 18, 2002 now U.S. Pat. No. 6,696,004.

BACKGROUND OF THE INVENTION

The present invention relates to a vinyl flooring product having a design visible from a top surface of the product, and more particularly to a vinyl flooring product having an web creating a pattern visible from above.

Vinyl is often applied to the back of carpet tile. Vinyl is also utilized to create flooring products. Textures have been added to the surface of some vinyl flooring products as described in U.S. Pat. No. 4,379,185. However, a need still exists to provide an improved flooring product, especially one with superior aesthetics.

SUMMARY OF THE INVENTION

Consequently, it is an object of the present invention to provide a vinyl flooring product having improved aesthetics, and particularly such a product which utilizing a mesh, screen or scrim, hereafter a skeletal framework, which is sandwiched intermediate vinyl layers. The finished product produces a pattern which has a top portion of the skeletal framework creating a pattern on a top surface of the cured vinyl and/or providing a visible pattern.

Vinyl preferably at least partially fills the voids, or openings, between runners in the skeletal framework as layers of vinyl sandwich the skeletal framework therebetween. Anticipated skeletal framework material include metal and nylon. A layer of vinyl is preferably placed against the skeletal framework. Another layer of vinyl is then applied to the skeletal framework to encapsulate the skeletal framework intermediate the vinyl layers.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
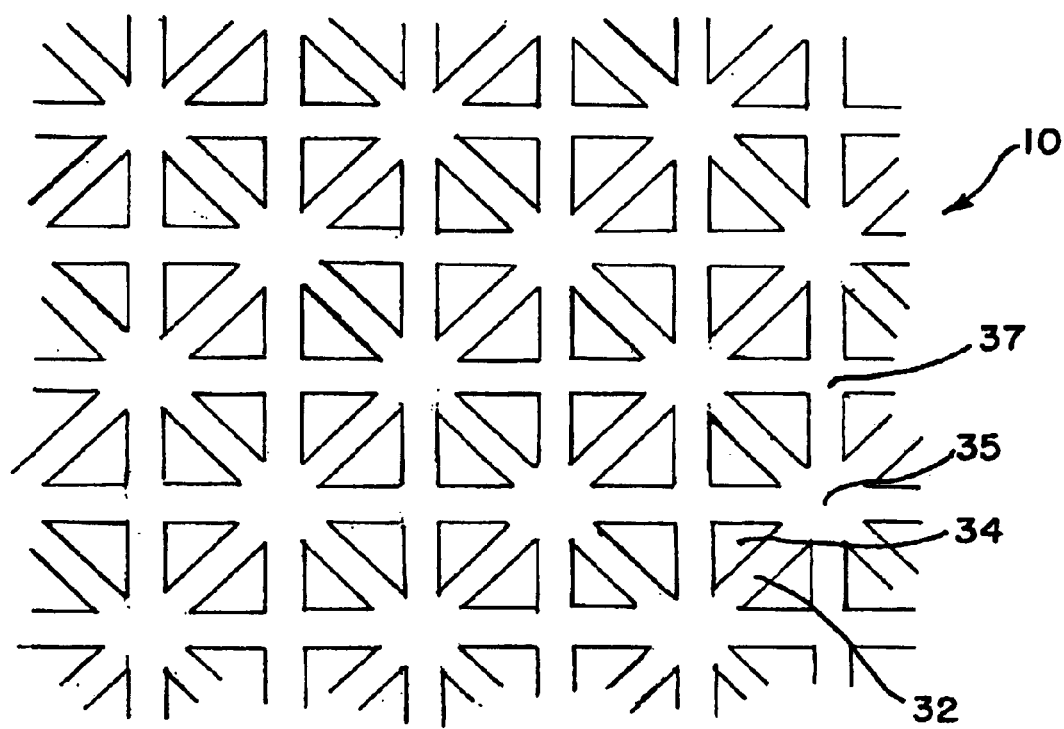
FIG. 1 is a top elevational view of a skeletal framework in the form of a mesh utilized in the present invention.
Figure 2:
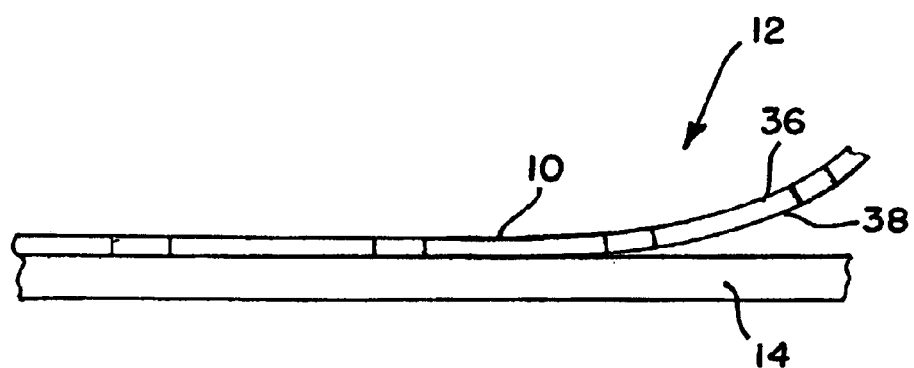
FIG. 2 is a side cross sectional view of the mesh of FIG. 1 placed atop a vinyl layer in the manufacture of a vinyl product of the present invention.

FIG. 1 shows a skeletal framework in the form of a mesh 10 for use in imbedding into a vinyl substrate. The mesh 10 has limbs or runners 32 which circumscribe openings 34. The runners 32 meet at one or more junctures 35,37. The runners 32 have top surfaces 36 and bottom surfaces 38 as shown in FIG. 2. While FIG. 1 shows one design of a metal skeletal framework in the form of a mesh, or screen, many other designs could be utilized including those with round openings, square openings, or other shaped openings. Furthermore, all openings 34 need not be identically shaped in a particular mesh pattern. The mesh 10 could also be nylon or other appropriate material.

FIG. 2 shows a step of the mesh 10 being manufactured into a vinyl flooring product 12 with the mesh 10 being placed on a first vinyl layer 14. In the pending application Ser. No. 10/125,290, incorporated by reference, the mesh 10 was imbedded into the first vinyl layer 14. While imbedding is a very good method of manufacture, in some embodiments, imbedding into a lower layer may, or may not, be necessary. Accordingly, the mesh 10 may, or may not, be imbedded into first vinyl layer 14. In the illustrated embodiment, the first vinyl layer 14 is cured, i.e., solid, and the mesh 10 is illustrated not imbedded into the first layer 14.

Figure 3:
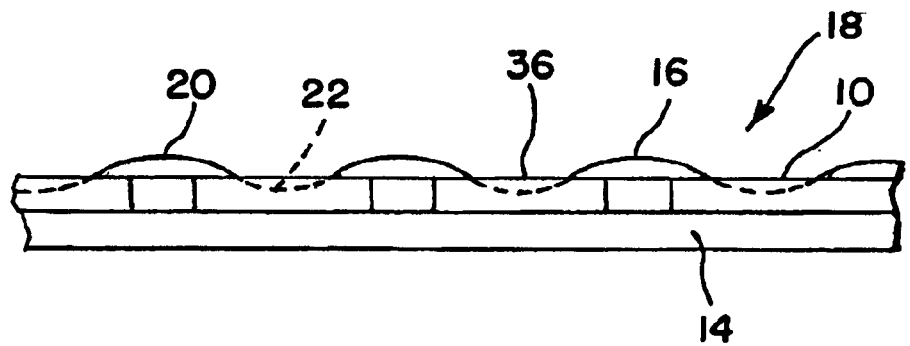
FIG. 3 is a side cross sectional view of a first embodiment of a vinyl product of the present invention.

FIG. 3 shows a vinyl floor product 18 having a second vinyl layer 16 placed over the mesh 10 which encapsulates and covers the mesh 10 so as to sandwich the mesh 10 intermediate the first and second layers 14,16. The peaks 20 of the second layer 18 extend above the upper surface 36 of the mesh 10, while the valleys 22 do not extend above the upper surface 36 of the mesh 10 in this embodiment. While the second layer 16 is preferably clear, or transparent vinyl, so that the mesh 10 may be seen from above, colored vinyl may also be utilized since the peaks 20 and valleys 22 form an interesting visual effect.

Figure 4:
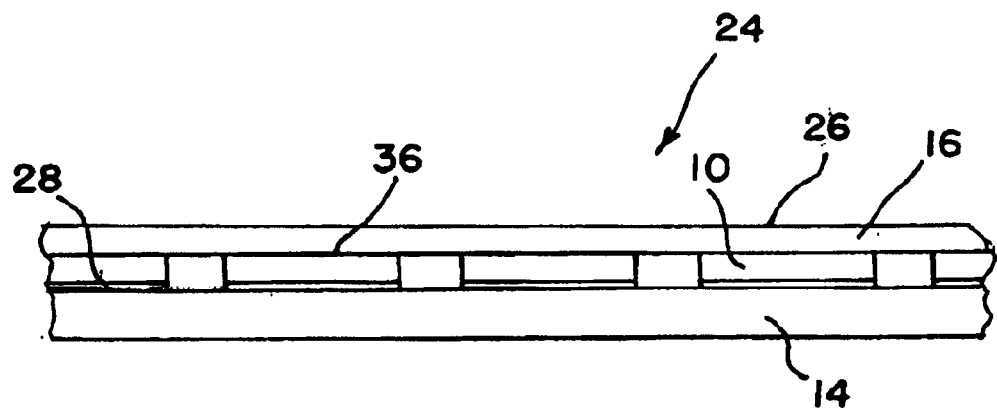
FIG. 4 is a side cross sectional view of an alternatively preferred embodiment of a vinyl product of the present invention.

FIG. 4 shows another embodiment of the flooring product 24 where the second layer 16 has been applied so that the peaks and valleys are substantially indistinguishable from one another, and the valleys to the extent they could be distinguished from the peaks of the top surface 26 of the second layer 16, do not dip below the upper surface 36 of the mesh 10.

When manufacturing vinyl products 18,24, it is preferable that the first layer 14 be at least partially, if not fully cured, so that the mesh 10 may be placed atop thereon. In the embodiment shown in FIG. 4, a third layer 28 is applied in a liquid form atop the first layer 14 so that the mesh 10 is fixed in position relative to the first layer 14. The mesh 10 may then be imbedded in the third layer 28 as described in co-pending application Ser. No. 10/125,290.

The second layer 18 is then applied atop the mesh 10 so that the mesh 10 is sandwiched intermediate the second and first layer 18,14. In fact, as shown in FIG. 4, the mesh 10 is sandwiched intermediate the second and third layers 18,28.

The second layer 18, first and/or third layer 14,28 encapsulate the mesh 10. The second layer 18 completely covers the mesh to form a top layer atop the mesh 10 and first layer 14.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A flooring product comprising:
    a first vinyl layer having a top surface;
    a skeletal frame having a pattern of runners disposed about openings, said runners having a height between a top surface and a bottom surface, the top surface of said skeletal frame extending above the top surface of the first vinyl layer; and
    a second continuous vinyl layer completely covering the top surface of the skeletal frame and the top surface of the first vinyl layer where exposed through the openings of the skeletal frame.

2. The flooring product of claim 1 wherein the pattern of the skeletal frame is a repeating pattern.

3. The flooring product of claim 1 wherein a top continuous surface of the second layer forms peaks and valleys, and said valleys extending a distance below the top surface of the skeletal frame.

4. The flooring product of claim 1 wherein the first vinyl layer is located below the bottom surface of the skeletal frame.

5. The flooring product of claim 1 wherein the second vinyl layer is opaque so that the skeletal mesh is visible from above.

6. The flooring product of claim 1 wherein the skeletal frame is a metal screen.

7. The flooring product of claim 1 wherein the openings between the runners are substantially filled with the second vinyl layer.

8. The flooring product of claim 1 wherein the skeletal frame is a nylon mesh.

9. The flooring product of claim 1 further comprising a third vinyl layer applied to the first vinyl layer wherein the third vinyl layer assists in retaining the skeletal frame relative to the first vinyl layer.

10. The flooring product of claim 1 wherein the bottom surface of the skeletal frame is located above the top surface of the first vinyl layer.

11. The vinyl flooring product of claim 1 wherein the second vinyl layer is one of a clear and a colored layer.

12. The vinyl flooring product of claim 1 wherein the first vinyl layer is at least partially cured prior to the application of the second vinyl layer.

13. A vinyl flooring product comprising:

a first vinyl layer;

a planar skeletal frame having a pattern of runners disposed about openings, said runners having a height between a top surface and a bottom surface, the top surface of said skeletal frame extending above the top surface of the first vinyl layer; and a second continuous vinyl layer applied over the skeletal frame completely covering the top surface of the skeletal frame.

14. The vinyl flooring product of claim 13 wherein the bottom surface of the skeletal frame is located above the a surface of the first vinyl layer.

15. The vinyl flooring product of claim 13 wherein the mesh is sandwiched intermediate the first and second vinyl layers.

16. The vinyl flooring product of claim 13 wherein the skeletal frame is encapsulated intermediate at least a portion of the first and second vinyl layers.

17. The vinyl flooring product of claim 13 further comprising a third vinyl layer atop the first vinyl layer.

* * * * *